(12) United States Patent
Minowa et al.

(10) Patent No.: US 7,513,180 B2
(45) Date of Patent: Apr. 7, 2009

(54) CUTTING DEVICE FOR THIN METALLIC PLATE

(75) Inventors: Yoshiyuki Minowa, Sayama (JP);
Fumitaka Haga, Sayama (JP); Takeshi Yoshimura, Sayama (JP); Yuichi Nagao, Sayama (JP); Takeyuki Fujiyama, Sayama (JP); Taro Nakamura, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 466 days.

(21) Appl. No.: 10/547,302

(22) PCT Filed: Apr. 7, 2004

(86) PCT No.: PCT/JP2004/005031
§ 371 (c)(1),
(2), (4) Date: Aug. 30, 2005

(87) PCT Pub. No.: WO2004/089568
PCT Pub. Date: Oct. 21, 2004

(65) Prior Publication Data
US 2006/0169115 A1  Aug. 3, 2006

(30) Foreign Application Priority Data
Apr. 9, 2003 (JP) ............... 2003-104829
Mar. 9, 2004 (JP) ............... 2004-066170
Mar. 9, 2004 (JP) ............... 2004-066171

(51) Int. Cl.
*B23B 3/04* (2006.01)

(52) U.S. Cl. .......................... 82/101; 82/92

(58) Field of Classification Search ............ 82/101, 82/92, 110; 451/51, 249, 398; 83/505, 506, 83/30, 690, 922; 156/137; 29/281.1
See application file for complete search history.

(56) References Cited

U.S. PATENT DOCUMENTS

| | | | | |
|---|---|---|---|---|
| 1,322,843 A | * | 11/1919 | Townsend | 82/47 |
| 1,353,558 A | * | 9/1920 | Avillar | 82/90 |
| 2,771,662 A | * | 11/1956 | Ziska | 82/83 |
| 3,386,323 A | * | 6/1968 | Dovey | 83/440.1 |
| 3,711,996 A | * | 1/1973 | Braden et al. | 451/67 |
| 3,875,833 A | * | 4/1975 | Kannegiesser et al. | 82/82 |
| 4,302,958 A | * | 12/1981 | Andriessen et al. | 72/71 |
| 5,152,047 A | * | 10/1992 | Kojima et al. | 29/411 |
| 5,592,741 A | * | 1/1997 | Vassar | 30/101 |
| 6,726,547 B2 | * | 4/2004 | Narusaki et al. | 451/65 |

FOREIGN PATENT DOCUMENTS

| | | |
|---|---|---|
| DE | 36 19 322 A1 | 12/1986 |
| FR | 2 354 167 A | 1/1978 |
| JP | 61-197117 A | 9/1986 |
| JP | 5-177426 A | 7/1993 |
| WO | WO-96/21542 A1 | 7/1996 |
| WO | WO-02/28580 A | 4/2002 |

* cited by examiner

*Primary Examiner*—Jason D Prone
*Assistant Examiner*—Joseph Defrank
(74) *Attorney, Agent, or Firm*—Birch, Stewart, Kolasch & Birch, LLP (57) ABSTRACT

A cutting device for a thin metallic plate is provided which shortens time for shaping or the like on a cut edge to improve manufacturing efficiency, and increases the life of a cutter. The cutting device for cutting a thin metallic plate W with a predetermined width includes a shearing cutter 7 which is made of a metal having a higher hardness than the thin plate W and has a blade angle of 50 to 90°. A contacting member 5 is provided which includes a groove 8 facing the shearing cutter 7 and makes contact with the back side of the thin plate W. In the groove 8, an interval a between upper edges 9a and 9b of inner walls 9 is set at 15 to 30 times a thickness b of the thin plate W. A depth c of a deepest portion 11 in the groove 8 is set at one to three times the thickness b of the thin plate W. The inner walls 9 of the groove 8 include curved surfaces 10, each of which has a curvature radius of 15 to 50 times the thickness b of the thin plate.

9 Claims, 10 Drawing Sheets

CUTTING DEVICE FOR THIN METALLIC PLATE

TECHNICAL FIELD

The present invention relates to a cutting device for cutting a thin metallic plate and particularly concerns a cutting device suitable for cutting in round slices a cylindrical drum formed of a thin metallic plate to form a plurality of metal rings.

BACKGROUND ART

For example, regarding belts used for power transmission in infinite variable speed drives, a laminated ring formed by stacking a plurality of metal rings is used to combine a plurality of elements arranged in a laminated construction like a ring. The metal rings constituting such a laminated ring are formed by cutting a cylindrical drum, which has been formed by performing weldbonding on both ends of a rectangular thin metallic plate, in round slices with a predetermined width.

Conventionally the following method is known: when the cylindrical drum is cut with a predetermined width to form the metal rings, one end of the drum is supported by clamping, a rotating grindstone is pressed from the outside of the other end of the drum, and the grindstone is moved in the circumferential direction of the drum, so that the drum is cut. However, when the drum is cut using the grindstone, a grinding allowance corresponding to the width of the grindstone is necessary, thereby reducing the yields of metal rings obtained from one drum. Further, when the drum is cut using the grindstone, drainage becomes complicated due to the grinding of a worn grindstone.

Thus, for example, a method of cutting the drum is known which uses a shearing cutter instead of the grindstone. In this case, although blurs do not appear on the corner edge of the inner periphery of the metal ring, relatively large blurs appear on the corner edge of the outer periphery, so that it takes a long time to perform shaping using barrel polishing after cutting. Further, another method is known in which a drum is cut by pressing shearing cutters to both of the inner periphery and the outer periphery of the drum, so that blurs are prevented on the corner edges of the inner periphery and the outer periphery. However, the shearing cutters may be damaged because the cutters may come into contact with each other after cutting the drum.

In order to eliminate such inconvenience, it is an object of the present invention to provide a cutter for a thin metallic plate, by which time for shaping cut edges and the like is reduced, manufacturing efficiency is improved, a thin metallic plate is cut with a predetermined width with enhanced yields, and the life of a cutter is increased.

DISCLOSURE OF THE INVENTION

In order to attain the above object, the present invention provides a cutting device for cutting a thin metallic plate with a predetermined width, comprising a shearing cutter which is pressed to a predetermined position on the front side of the thin plate to cut the thin plate, and a contacting member which has a groove facing the cutting position of the shearing cutter and makes contact with the back side of the thin plate, wherein the shearing cutter is made of a metal having a higher hardness than the thin plate and has a blade angle of 50 to 90°, the groove of the contacting member is shaped like a letter V in cross section, an interval between the upper edges of the opposing inner walls of the groove is 15 to 30 times the thickness of the thin plate, the depth of the deepest portion at the center of the groove is one to three times the thickness of the thin plate, and the inner walls of the groove have curved surfaces each of which has a curvature radius of 15 to 50 times the thickness of the thin plate and is expanded to the inside of the groove.

When the thin metallic plate is cut in the present invention, the shearing cutter first cuts in the thin plate while applying a pressure to the thin plate. At this point, the thin plate pressed by the cutter is gradually bent along the curved surfaces on the inner walls of the groove. On a portion where the cutter cuts in, a material flow occurs in a direction of separating from the cutter. Accordingly, the uncut side is stretched to the edge of the cutter and a portion where the edge of the cutter faces is locally reduced in thickness, so that a constriction is formed which is deformed in a concave manner to the edge of the cutter. Then, in a state in which the constriction remains, the thin plate is cut without making contact with the deepest portion of the groove. The remaining constriction can reduce the occurrence of blurs on cut edges.

The blade angle of the cutter and the shape of the groove of the contacting member are determined based on various kinds of tests conducted by the inventor. To be specific, the following was proved by the tests: regarding the shearing cutter having a blade angle of 50 to 90°, when the blade angle is larger than 90°, an amount of the material flow pressed to both sides excessively increases when the cutter cuts in the thin plate, causing warpage and waviness on the thin plate. When the blade angle is smaller than 50°, the edge of the cutter becomes too sharp and nick or the like on the blade reduces durability.

Further, the interval between the upper edges of the inner walls of the groove is 15 to 30 times the thickness of the thin plate. In the case where the interval is smaller than 15 times, the thin plate is not bent gradually along the curved surfaces on the inner walls of the groove when the thin plate is pressed by the cutter, causing blurs along the inner walls of the groove after cutting. In the case where the interval is larger than 30 times, the thin plate makes contact with the deepest portion of the groove before being cut, resulting in an insufficient constriction.

Moreover, the depth of the deepest portion at the center of the groove is one to three times the thickness of the thin plate. In the case where the depth is smaller than one time, the thin plate makes contact with the deepest portion of the groove before being cut, resulting in an insufficient constriction. In the case where the depth is larger than three times, it becomes difficult to form the curved surfaces each of which has a curvature radius of 15 to 50 times the thickness of the thin plate.

Additionally, the curved surface has a curvature radius of 15 to 50 times the thickness of the thin plate. In the case where the curvature radius is smaller than 15 times, the thin plate is not bent gradually along the curved surfaces of the inner walls of the groove when the thin plate is pressed by the cutter, causing blurs along the inner walls of the groove after cutting. In the case where the curvature radius is larger than 50 times, when the thin plate is pressed by the cutter, the thin plate makes contact with the deepest portion of the groove before being cut, resulting in an insufficient constriction.

Based on the above test results, the blade angle of the shearing cutter is set at 50 to 90° in the present invention. Moreover, as to the groove of the contacting member, the interval between the upper edges of the inner walls is set at 15 to 30 times the thickness of the thin plate, the depth of the deepest portion is set at one to three times the thickness of the thin plate, and the curvature radius of the curved surface is set at 15 to 50 times the thickness of the thin plate.

By using the cutter and the shape of the groove, a constriction can be formed on the cutting position of the thin plate. Therefore, the cut edge has just a small number of blurs and it is possible to perform shaping which uses barrel polishing or brush polishing in a short time, thereby improving manufacturing efficiency. Further, it is possible to cut the thin metallic plate with a predetermined width while achieving enhanced yields, and it is possible to prevent the edge of the cutter from making contact with the deepest portion of the groove, thereby increasing the life of the cutter.

In the present invention, the groove of the contacting member comprises a flat portion which is evenly formed so that the deepest portion has a constant depth between the inner walls. With this configuration, the cut edges of the thin plate are formed according to the flat portion of the groove after cutting, thereby forming a larger constriction.

To be specific, when the thin plate is cut along the groove by the shearing cutter, the following are formed on the cut edge of the thin plate: a first cut inclined surface which is inclined along the face of the shearing cutter, a second cut inclined surface which is inclined along the flat portion of the groove, and a cut top portion where the edge of the first cut inclined surface and the edge of the second cut inclined surface intersect with each other. Further, the width of the flat portion between the inner walls of the groove permits the second cut inclined surface to have a desired shape on the cut edge of the thin plate.

In order to perform shaping using barrel polishing or brush polishing in a shorter time on the cut edges of the thin plate, the cut top portion formed on the cut edges of the thin plate is positioned at the center of the thickness. That is, the first cut inclined surface and the second cut inclined surface have analogous shapes by positioning the cut top portion at the center of the thickness, thereby reducing a shaping amount made by polishing. Moreover, it is possible to determine a width from the starting point of the second cut inclined surface to the cut top portion beforehand. The width is necessary for positioning the cut top portion of the thin plate at the center of the thickness of the thin plate. Hence, in the present invention, when a width from the starting point of the second cut inclined surface to the cut top portion is set beforehand to position the cut top portion of the thin plate at the center of the thickness of the thin plate, the width of the flat portion between the inner walls of the groove is set at twice the width of the second cut inclined surface. Thus, when the thin plate is cut on the groove by the shearing cutter, the second cut inclined surface can be formed with a set width and the cut top portion is positioned at the center of the thickness of the thin plate, so that shaping using barrel polishing or brush polishing can be performed in a shorter time.

Further, as one embodiment of the present invention, the thin metallic plate forms a cylindrical drum and the contacting member is formed into a cylinder which can make contact with the inner peripheral surface of the drum and holds the drum on the outer periphery of thereof. A plurality of the grooves are formed on the outer periphery of the contacting member at predetermined intervals. The shearing cutter is formed like a disk having a cutting edge on the circumference thereof. The shearing cutter cuts in the grooves on the outer peripheral surface of the drum while rotating. The shearing cutter cuts the drum with a predetermined width in the circumferential direction to form a metal ring shaped like an endless belt. According to this embodiment, the drum formed of the thin metallic plate is cut in round slices with enhanced yields and thus a plurality of metal rings can be formed with high efficiency.

Moreover, the contacting member comprises a plurality of slots borne in the longitudinal direction and is expandable in a diameter direction. By permitting the contacting member to freely increase in diameter, the diameter is increased after insertion into the drum, so that the contacting member can be sufficiently brought into contact with the drum. Insufficient contact between the drum and the contacting member causes warpage and waviness on the drum and variations in the width of the metal ring after cutting. Hence, in the present invention, the diameter of the contacting member is increased to obtain sufficient contact between the drum and the contacting member, thereby preventing warpage and waviness on the drum and variations in the width of the metal ring.

In the present invention, when variations in the width of the metal ring can be tolerated, the contacting member can be used without being increased in diameter. In the present invention, the contacting member comprises clamping means for fixing one end of the drum when the drum is held on the outer periphery thereof. When the shearing cutter cuts in the groove via the drum, the position of the edge of the shearing cutter is set closer to the unfixed side on the other end of the drum by a distance within one third of the thickness of the drum from the center of the interval between the upper edges of the opposing inner walls of the groove.

When a metal ring is formed from the drum by the cutter, the drum is cut off to both sides of the cutter. At this point, shapes are slightly different between a cut edge formed on the unfixed side of the drum with respect to the cutter (the cut edge of the cut metal ring) and a cut edge formed on the fixed side of the drum with respect to the cutter (the cut edge of the drum fixed by the holder). That is, when the drum is cut along the groove by the shearing cutter, the following are formed on the cut edge of the drum: the first cut inclined surface which is inclined along the face of the shearing cutter, the second cut inclined surface which is inclined along a constriction formed by the groove, and the cut top portion where the edge of the first cut inclined surface and the edge of the second cut inclined surface intersect with each other. According to comparison between the cut edge formed on the unfixed side of the drum and the cut edge formed on the fixed side of the drum, the first cut inclined surface and the second cut inclined surface on the fixed side of the drum are smaller than those on the unfixed side and the position of the cut top portion on the fixed side of the drum is closer to the center of the thickness of the plate as compared with the cut top portion on the unfixed side. Such a difference in the shapes of the cut edges occurs for the following reason: on the unfixed side of the drum, the cut edge is immediately separated from the cutter after cutting, and on the fixed side of the drum, the cut edge makes contact with the cutter and is partially rubbed away until the cutter completely withdraws from the groove after cutting. Such a difference between the cut edges varies the shapes of the cut edges on both sides of the metal ring having been formed by cutting. Thus, it may become impossible to shorten processing time for shaping the cut edge in a predetermined form by barrel polishing or brush polishing.

Hence, the inventor conducted various kinds of tests and found that as the position of the edge of the shearing cutter comes closer to the unfixed side of the drum from the center of the interval between the upper edges of the opposed inner walls of the groove during cutting, the first cut inclined surface and the second cut inclined surface of the cut edges formed on the unfixed side of the drum are reduced and the position of the cut top portion comes closer to the center of the thickness of the thin plate from the unfixed side of the drum due to the influence of the shape of the groove. Further, the tests proved that when the position of the edge of the shearing cutter comes closer to the unfixed side of the drum by a distance exceeding one third of the thickness of the drum from the center of the interval between the upper edges of the opposed inner walls of the groove during cutting, a sufficient constriction cannot be formed on the cut edge on the unfixed side of the drum and cutting accuracy cannot be maintained.

Based on the tests, in the present invention, the position of the edge of the shearing cutter is set closer to the unfixed side of the drum by a distance within one third of the thickness of the drum from the center of the interval between the upper edges of the opposed inner walls of the groove during cutting. Thus, the difference in shape between the cut edge formed on the unfixed side of the drum and the cut edge formed on the fixed side of the drum becomes extremely small and barrel polishing or brush polishing for shaping the cut edge in a predetermined form can be performed in a short time.

Furthermore, in the present invention, during the cutting of the drum, the position of the edge of the shearing cutter is preferably set at a distance of 0.2 to 0.4 times the thickness of the drum from the deepest portion of the groove when the shearing cutter enters most deeply in the groove.

Based on the tests, the inventor found that the shape of the cut edge changes according to a depth of the shearing cutter in the groove during the cutting of the drum. When a distance between the edge of the shearing cutter and the deepest portion of the groove is smaller than 0.2 times the thickness of the drum, it takes a long time for the cutter to completely withdraw from the groove after cutting, thereby increasing contact time of the cutter and the cut edge on the fixed side of the drum. Thus, the cut edge formed on the unfixed side of the drum and the cut edge formed on the fixed side of the drum become different in shape. Moreover, when a distance between the edge of the shearing cutter and the deepest portion of the groove is larger than 0.4 times the thickness of the drum, the depth of the shearing cutter in the groove becomes smaller and the pressing force of the drum to the inner walls of the groove is reduced, thereby insufficiently forming the constriction. For this reason, in the present invention, the edge of the shearing cutter is caused to reach a position at a distance of 0.2 to 0.4 times the thickness of the drum from the deepest portion of the groove. Thus, the difference in shape between the cut edge formed on the unfixed side of the drum and the cut edge formed on the fixed side of the drum becomes extremely small and metal rings can be positively formed by cutting.

BEST MODE FOR CARRYING OUT THE INVENTION

Figure 1:
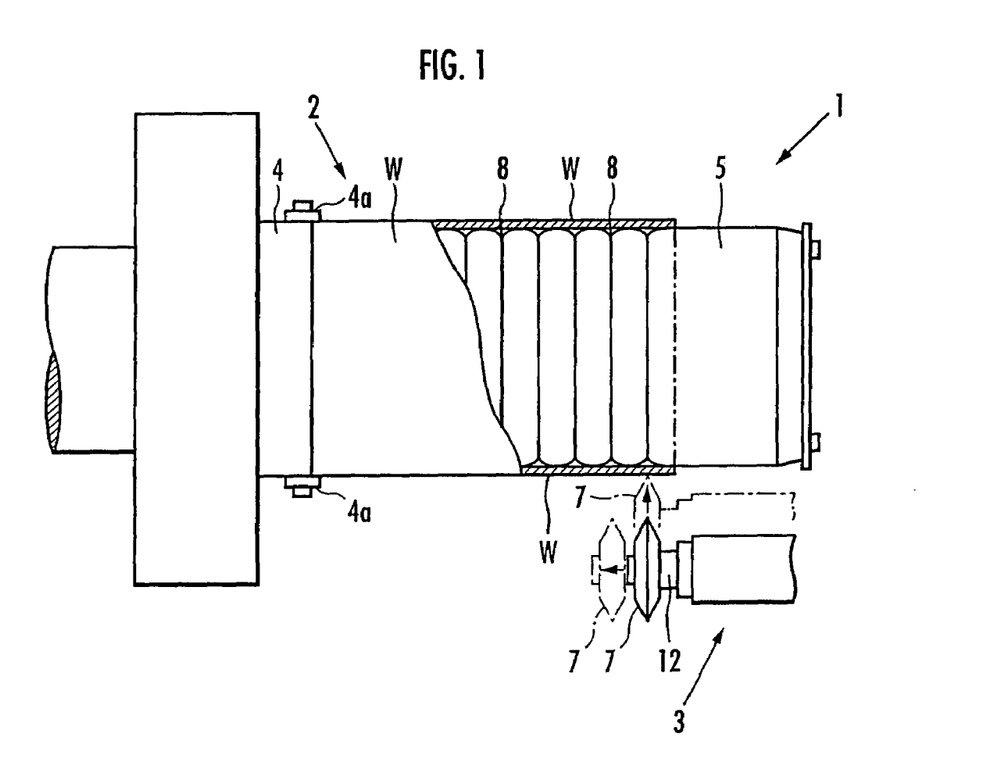
FIG. 1 is an explanatory drawing showing an apparatus according to one embodiment of the present invention.

A cutting device 1 of the present embodiment shown in FIG. 1 cuts a metal drum W in round slices with a predetermined width to manufacture metal rings for a belt of an infinite variable speed drive (not shown). The drum W is formed as follows: a flat thin plate which is shaped like a rectangle and is made of a maraging steel is formed into a cylinder and then both edges of the plate are butt against each other and are subjected to weldbonding.

As shown in FIG. 1, the cutting device 1 of the present embodiment is constituted of drum holding means 2 for holding the drum W and cutting means 3 for cutting the drum W.

The drum holding means 2 comprises a support shaft 4 which is rotated by rotary driving means (not shown) and a holder 5 which is connected to the support shaft 4, holds the drum W on the outer periphery of the holder 5, and serves as a contacting member making contact with the inner surface of the drum W.

As shown in FIG. 1, the holder 5 is made of a metal and is shaped like a cylinder. On the outer periphery of the holder 5, a plurality of grooves 8 are formed at predetermined intervals along the cutting positions of the drum W (the cutting positions of a shearing cutter 7, which will be described later). The drum W held by the holder 5 is fixed so that one end of the drum W is clamped by a plurality of clamping means 4a provided on the support shaft 4 and the drum W is rotated together with the holder 5.

Figure 2:
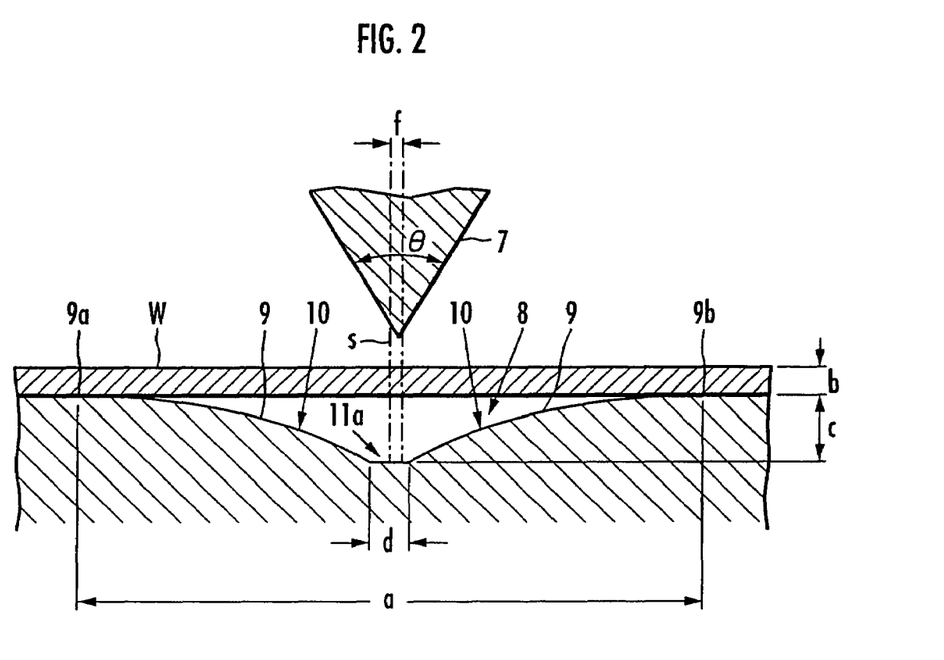
FIG. 2 is an explanatory sectional view showing a cutter and a groove.

As shown in FIG. 2, the groove 8 formed on the holder 5 is shaped almost like a letter V in cross section. To be specific, curved surfaces 10, which are so curved as to expand to the inside of the groove 8, are formed on inner walls 9 on both sides of the groove 8 in the present embodiment. Besides, an interval a between upper edges 9a and 9b of the inner wall 9 on both sides of the groove 8 is about 20 times (15 to 30 times are allowed) a thickness b of the drum W. Further, a depth c of a deepest portion 11 of the groove 8 is about twice (one to three times are allowed) the thickness b of the drum W, and the curved surface 10 of the inner wall 9 has a curvature radius which is about 30 times (15 to 50 times are allowed) the thickness b of the drum W. Furthermore, the deepest portion 11 is formed evenly between the inner walls 9 on both sides. The width d of a flat portion 11a is set according to the shape of a cut edge when the drum W is cut (specifically described later).

As shown in FIG. 1, the cutting means 3 comprises a rotary shaft 12 and the shearing cutter 7 which is shaped like a disk and is supported integrally with the rotary shaft 12. The cutting means 3 comprises moving forward/backward means (not shown) for moving the shearing cutter 7 to and from the drum W along the axial direction of the drum W. Moreover, the shearing cutter 7 is freely rotated by the rotary shaft 12. The shearing cutter 7 can freely rotate and thus the shearing cutter 7 is dragged due to contact with the drum W rotated by the drum holding means 2, so that the drum W is sheared by the entire circumference of the shearing cutter 7. Further, the drum W is cut by the shearing cutter 7 of the cutting means 3 with a predetermined width from the unfixed side of the drum W (from a side not being fixed to the holder 5 by the clamping means 4a). Besides, the shearing cutter 7 may be rotary driven by the rotary driving means (not shown) via the rotary shaft 12.

The shearing cutter 7 is made of a metal such as a cemented carbide and a high-speed steel which are higher in hardness than the maraging steel. As shown in FIG. 2, a blade angle θ is set at 60° (50 to 90° are allowed).

When the drum W is cut in round slices by the apparatus 1 configured thus and metal rings are formed, as shown in FIG. 1, the drum W which is inserted externally and is supported by the holder 5 is first rotated by the drum holding means 2. Subsequently, the cutting means 3 moves close to the drum W and the shearing cutter 7 cuts in the drum W. At this point, since the drum W is rotated, the shearing cutter 7 cuts in the entire circumference of the drum W and metal rings are obtained with a predetermined width.

Figure 3:
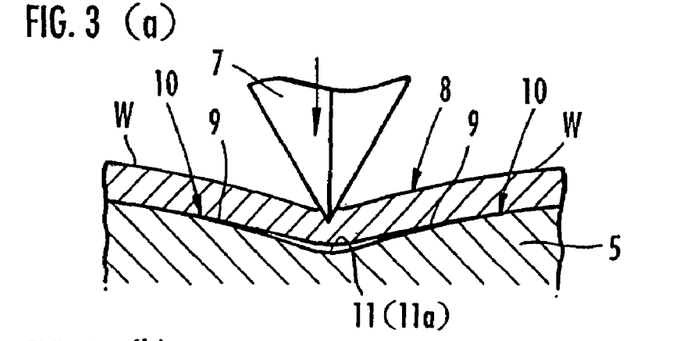
FIG. 3 is an explanatory drawing showing the cutting steps of a drum according to the present embodiment.

The following will describe operations when the shearing cutter 7 cuts in the drum W. First, as shown in FIG. 3(A), when the shearing cutter 7 is pressed against the drum W, the shearing cutter 7 cuts in the outer periphery of the drum W, so that cutting is started. At this point, as shown in FIG. 2, the cutting position of the edge of the shearing cutter 7 is set closer to the unfixed side (to the right in FIG. 2) of the drum W by a distance within the distance f, which is one third of the thickness b of the drum W, from center s of the interval a between the upper edges 9a and 9b of the inner walls 9 on both sides of the groove 8. The cutting position is controlled by the moving forward/backward means.

Then, as shown in FIG. 3(A), the drum W pressed by the shearing cutter 7 is bent along the curved surfaces 10 on the inner walls 9 of the groove 8. At this point, the drum W is separated from the deepest portion 11 of the groove 8 or just instantly makes a contact with the deepest portion 11.

Figure 4:
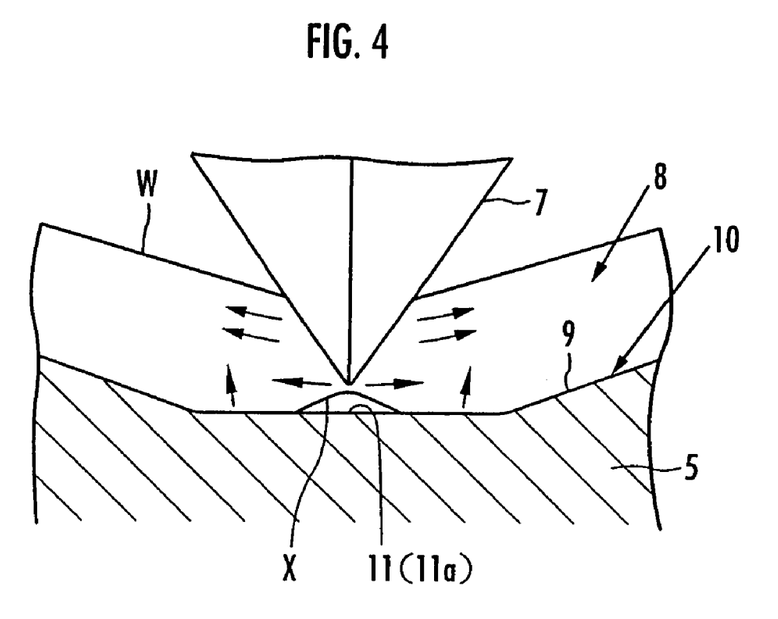
FIG. 4 is an explanatory sectional view showing an enlarged part of the drum during cutting.

Subsequently, as shown in FIG. 3(B), the shearing cutter 7 further cuts in the drum W. When the edge of the shearing cutter 7 comes close to the inner surface of the drum W, a constriction X is formed on the inner surface of the drum W. The constriction X is deformed in a concave manner to the edge of the shearing cutter 7. The constriction X is formed as shown in FIG. 4, in which the cutting of the shearing cutter 7 causes a material flow in the metal of the drum W in a direction of separating from the shearing cutter 7, the uncut inner peripheral surface of the drum W is stretched accordingly, and a portion where the edge of the shearing cutter 7 faces is locally reduced in thickness. Therefore, the dimensions of the groove 8 are set so that the drum W is bent along the curved surfaces 10 on the inner walls 9 to generate a material flow in the metal of the drum W and the drum W is separated from the deepest portion 11 of the groove 8 to smoothly generate the constriction X. That is, the inventor conducted various kinds of tests on the relationship between the dimensions of the groove 8 and the occurrence of the constriction X, and the test results proved that the constriction X can be positively generated by setting the interval a between the upper edges 9a and 9b of the inner walls 9 on both sides of the groove 8 at 15 to 30 times the thickness b of the drum W, setting the depth c of the deepest portion 11 of the groove 8 at one to three times the thickness b of the drum W, and setting the curvature radius of the curved surface 10 on the inner wall 9 at 15 to 50 times the thickness b of the drum W. Based on the results, the interval a between the upper edges 9a and 9b of the inner walls 9 on both sides of the groove 8 is set at about 20 times the thickness b of the drum W, the depth c of the deepest portion 11 of the groove 8 is set at about two times the thickness b of the drum W, and the curvature radius of the curved surface 10 is set at about 30 times the thickness b in the present embodiment, so that the constriction X is sufficiently generated.

Subsequently, as shown in FIG. 3(C), the drum W is cut by the shearing cutter 7 in a state in which the constriction X is separated from the deepest portion 11 of the groove 8. At this point, the position of the edge of the shearing cutter 7 is set at a distance of 0.2 to 0.4 times the thickness of the drum from the deepest portion 11 of the groove 8, and the position of the edge is controlled by the moving forward/backward means. Hence, cutting is completed without permitting the shearing cutter 7 to come into contact with the deepest portion 11 of the groove 8. Additionally, when the blade angle of the shearing cutter 7 is larger than 90°, an amount of the material flow pressed to both sides excessively increases when the shearing cutter 7 cuts in the drum W, causing warpage and waviness on the drum W. When the blade angle is smaller than 50°, the edge of the shearing cutter 7 becomes too sharp and nick or the like on the blade reduces durability. For this reason, it is preferable to set the blade angle of the shearing cutter 7 at 50 to 90°. Accordingly the blade angle of the shearing cutter 7 is set at 60° in the present embodiment. Further, regarding the position of the edge of the shearing cutter 7 at the completion of cutting, when a distance h between the edge of the shearing cutter 7 and the deepest portion 11 of the groove 8 is smaller than 0.2 times the thickness b of the drum, it takes along time for the shearing cutter 7 to completely withdraw from the inside of the groove 8 after cutting, thereby increasing contact time of the shearing cutter 7 and the cut edge on the fixed side of the drum W. Thus, the cut edge formed on the unfixed side of the drum W and the cut edge formed on the fixed side of the drum W become different in shape. Moreover, when a distance between the edge of the shearing cutter 7 and the deepest portion 11 of the groove 8 is larger than 0.4 times the thickness of the drum W, the depth of the shearing cutter 7 in the groove 8 becomes smaller and the pressing force of the drum W to the innerwalls 9 of the groove 8 is reduced, thereby insufficiently forming the constriction X. For this reason, the position of the edge of the shearing cutter 7 at the completion of cutting is preferably set at a distance of 0.2 to 0.4 times the thickness b of the drum W from the deepest portion 11 of the groove 8. Thus, the difference in shape between the cut edge formed on the unfixed side of the drum W and the cut edge formed on the fixed side of the drum W becomes extremely small and metal rings can be positively formed by cutting.

Then, as shown in FIG. 3(D), the shearing cutter 7 is moved back and separated from the drum W. Since the constriction X is generated on the inner peripheral surface of the drum W, the drum W is cut while a curved shape due to the constriction X remains on the corner edge of the inner peripheral surface, and a metal ring is formed. Furthermore, as shown in FIG. 2, the cutting position of the edge of the shearing cutter 7 is set closer to the unfixed side (to the right in FIG. 2) of the drum W by a distance within the distance f, which is one third of the thickness b of the drum W, from the center s of the interval a between the upper edges 9a and 9b of the inner walls 9 on both sides of the groove 8. Hence, even in the case where the cut edge on the fixed side of the drum W makes contact with the shearing cutter 7 and the cut edge is partially rubbed away when the shearing cutter 7 is moved back and separated from the drum W, the difference in shape from the cut edge on the unfixed side of the drum W (the edge of the cut metal ring) becomes extremely small.

Figure 5:
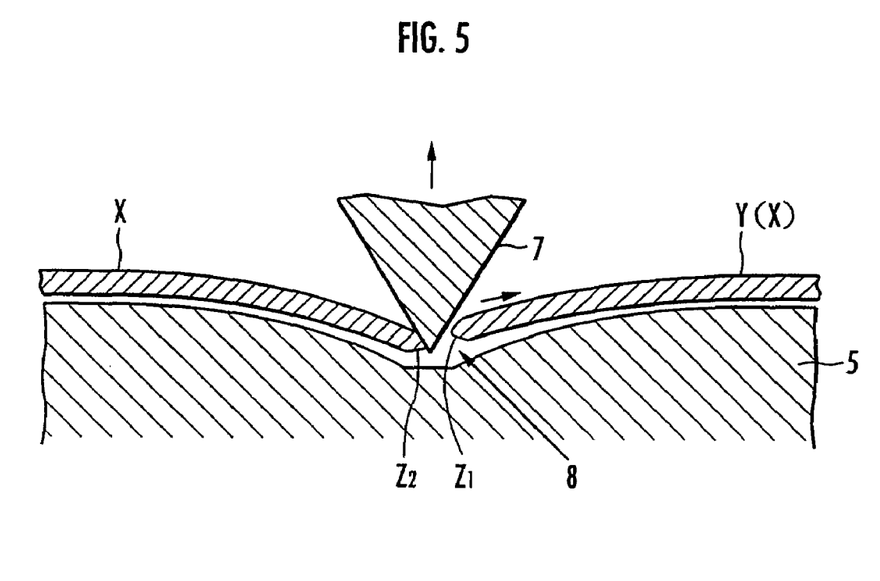
FIG. 5 is an explanatory drawing showing a part of the cutting step of the drum.
Figure 6:
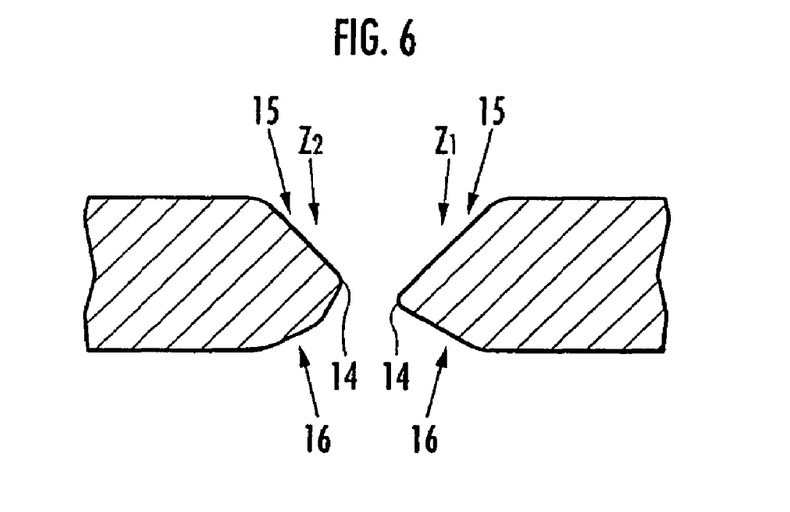
FIG. 6 is an explanatory sectional view showing the shape of a cut edge of another drum for comparison.

To be specific, as shown in FIG. 5, when the shearing cutter 7 is separated from the groove 8, a metal ring Y having been cut on the unfixed side of the drum W can freely move. A cut edge $Z_1$ of the metal ring Y is separated from the shearing cutter 7 immediately after the metal ring Y is cut. However, a cut edge $Z_2$ on the fixed side of the drum W is not immediately separated from the shearing cutter 7 because one end of the drum W is fixed, so that the cut edge $Z_2$ is in contact with the shearing cutter 7 until the shearing cutter 7 completely withdraws from the groove 8. Thus, when the cutting position of the edge of the shearing cutter 7 is set at the center s of the interval a between the upper edges 9a and 9b of the inner walls 9 on both sides of the groove 8, as shown in FIG. 6, the cut edge $Z_2$ on the fixed side of the drum W is partially rubbed away by the shearing cutter 7, resulting in a large difference in shape between the cut edge $Z_2$ on the fixed side of the drum W and the cut edge $Z_1$ on the unfixed side of the drum W. For this reason, the cutting position of the edge of the shearing cutter 7 is set closer to the unfixed side (to the right in FIG. 6) beforehand in the present embodiment, thereby reducing the formation region of the cut edge $Z_1$ on the unfixed side of the drum W and forming the cut edges $Z_1$ and $Z_2$ into extremely analogous shapes, as shown in FIG. 7.

Figure 7:
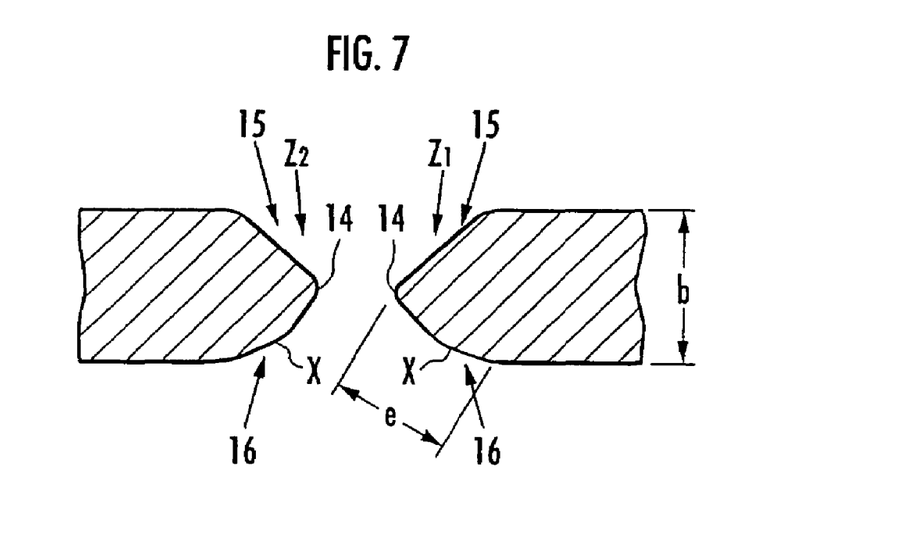
FIG. 7 is an explanatory sectional view showing the shape of a cut edge formed on the drum according to the present embodiment.

Therefore, as shown in FIG. 7, the present embodiment allows the cut edge $Z_2$ on the fixed side of the drum W and the cut edge $Z_1$ serving as the metal ring Y on the unfixed side of the drum W to have extremely analogous shapes and causes the constriction X to prevent blurs on the cut edges $Z_1$ and $Z_2$, thereby reducing time for shaping using barrel polishing or brush polishing which is conducted in the subsequent process. Further, since cutting is performed by the shearing cutter 7, the cut edges $Z_1$ and $Z_2$ are less rubbed away as compared with the use of a grindstone, thereby improving the yields of the metal ring Y obtained from the drum W.

The following will discuss the width d of the flat portion 11a formed on the deepest portion 11 of the groove 8. As shown in FIG. 4, when the shearing cutter 7 cuts the drum W, the drum W is cut while the constriction X of the drum W is separated from the deepest portion 11 of the groove 8. Further, the cutting pressure of the shearing cutter 7 is applied to a portion where the cut edge makes contact with the shearing cutter 7, and the portion is inclined according to the shape of the shearing cutter 7 (first cut inclined surface 15). On the other hand, at this point, a portion where the cut edge makes contact with the groove 8 is pressed and deformed on the flat portion 11a and is inclined according to the shape of the flat portion 11a (second cut inclined surface 16). Thus, the second cut inclined surface 16 is formed according to the flat portion 11a and the constriction X is stretched accordingly, so that the position of a cut top portion 14 can be set closer to the center of the thickness b.

Further, as shown in FIG. 7, a width e of the second cut inclined surface 16 is determined beforehand when the cut top portion 14 is positioned at the center of the thickness b, and as shown in FIG. 2, the width d of the flat portion 11a is set at two times the width e of the second cut inclined surface 16, so that the cut top portion 14 can be accurately positioned at the center of the thickness b as shown in FIG. 7.

Figure 8:
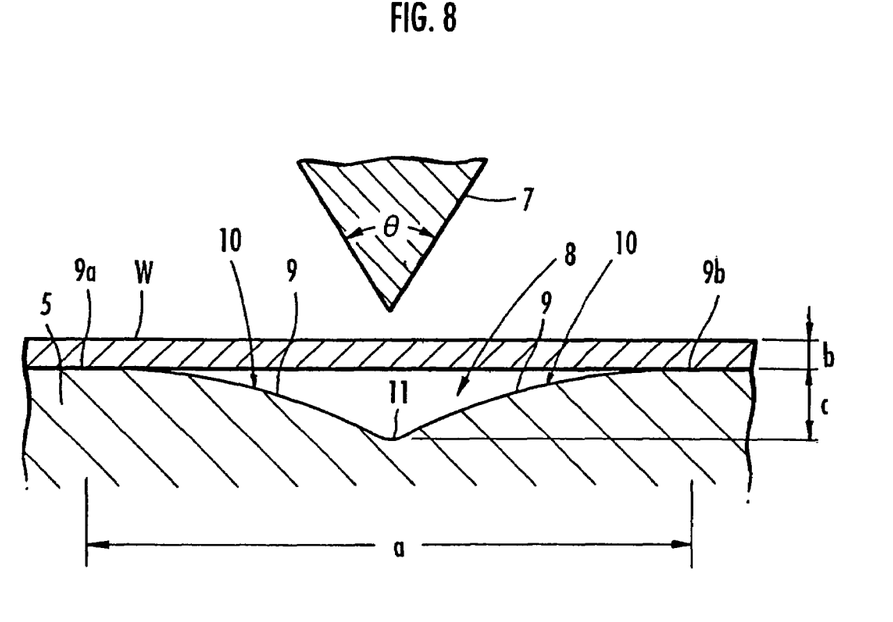
FIG. 8 is an explanatory sectional view showing another groove.
Figure 9:
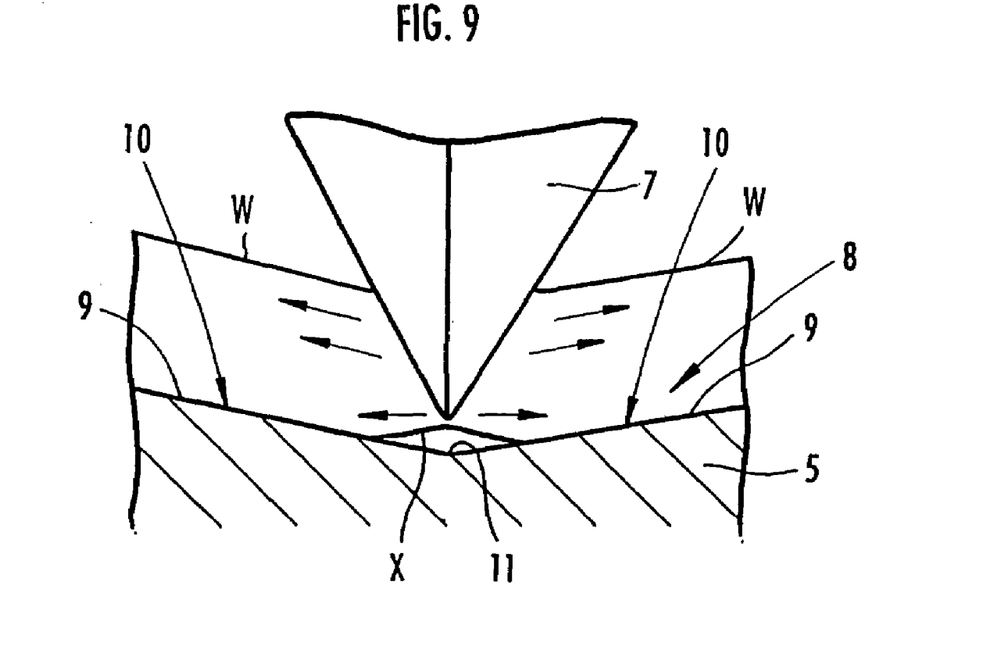
FIG. 9 is an explanatory sectional view showing an enlarged part of the drum when cutting is performed using the groove of FIG. 8.
Figure 10:
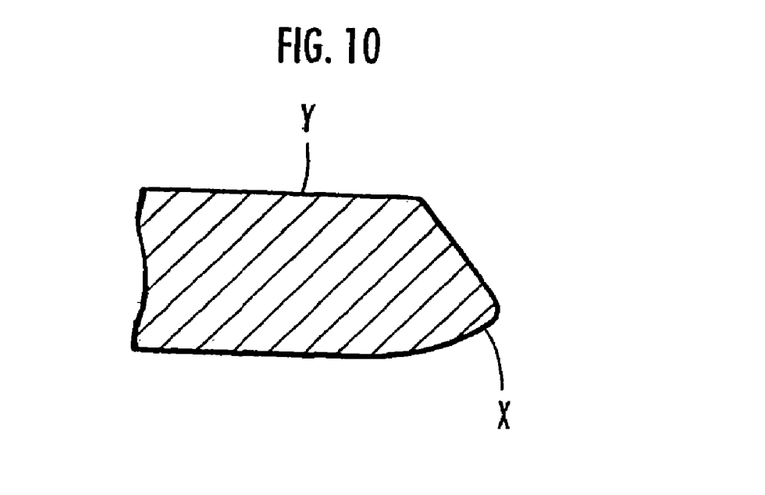
FIG. 10 is an explanatory sectional view showing the shape of a cut edge formed using the groove of FIG. 8.

In the present embodiment, the flat portion 11a is formed on the deepest portion 11 of the groove 8 to set the position of the cut top portion 14 closer to the center of the thickness b. For example, even when the flat portion is not formed on the deepest portion 11 of the groove 8 as shown in FIG. 8, as shown in FIG. 9, the cutting of the shearing cutter 7 causes a material flow in the metal of the drum W in a direction of separating from the shearing cutter 7, the uncut inner peripheral surface of the drum W is stretched accordingly, and a portion where the edge of the shearing cutter 7 faces is locally reduced in thickness. Thus, as shown in FIG. 10, it is possible to sufficiently form the constriction X and prevent the occurrence of blurs on the cut edges of the metal ring Y.

Moreover, in the present embodiment, in order to have extremely analogous shapes on the cut edge $Z_2$ on the fixed side of the drum W and the cut edge $Z_1$ serving as the metal ring Y on the unfixed side of the drum W as shown in FIG. 7, the cutting position of the edge of the shearing cutter 7 is set closer to the unfixed side (to the right in FIG. 2) of the drum W by a distance within the distance f, which is one third of the thickness b of the drum W, from the center s of the interval a between the upper edges 9a and 9b of the inner walls 9 on both sides of the groove 8 as shown in FIG. 2. For example, when a main object is to prevent the occurrence of blurs on the cut edges and analogous shapes are not necessary on the cut edge $Z_1$ and the cut edge $Z_2$, the cutting position of the edge of the shearing cutter 7 may be set at the center s of the interval a between the upper edges 9a and 9b of the inner walls 9 on both sides of the groove 8.

Figure 11:
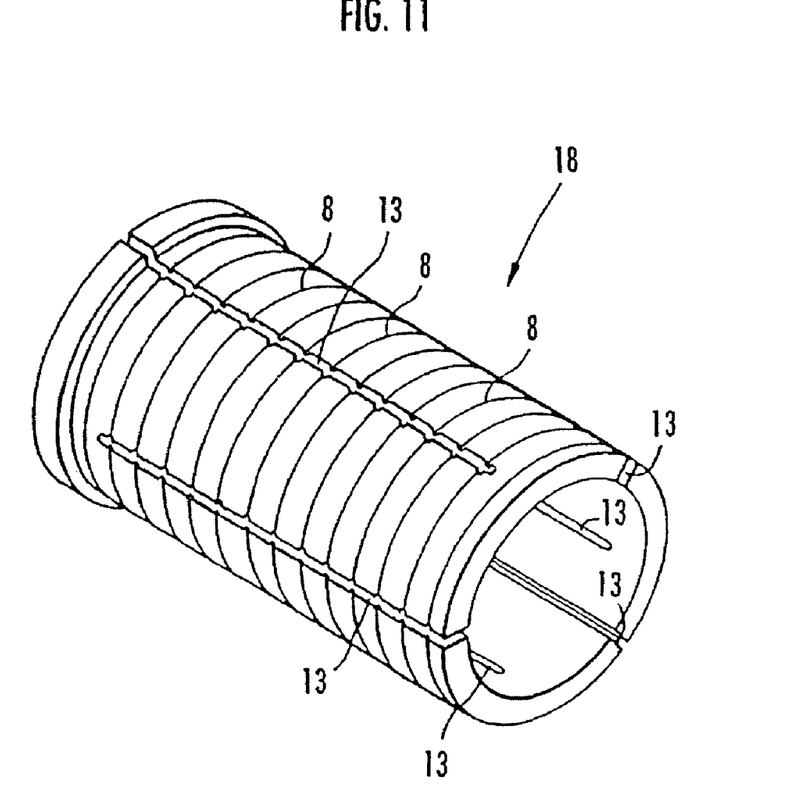
FIG. 11 is an explanatory drawing showing another holder.

In this case, as shown in FIG. 11, a cylindrical holder 14 may be adopted on which a plurality of slots 13 are formed along the longitudinal direction. Regarding the slots 13 formed on the holder 14, one is opened on one end of the holder 14 and another is opened on the other end in an alternating manner. The outside diameter of the holder 14 can be expanded by increasing an interval between the slots 13. The groove 8 formed on the holder 14 is similar in shape to the above-described groove 8.

Figure 12:
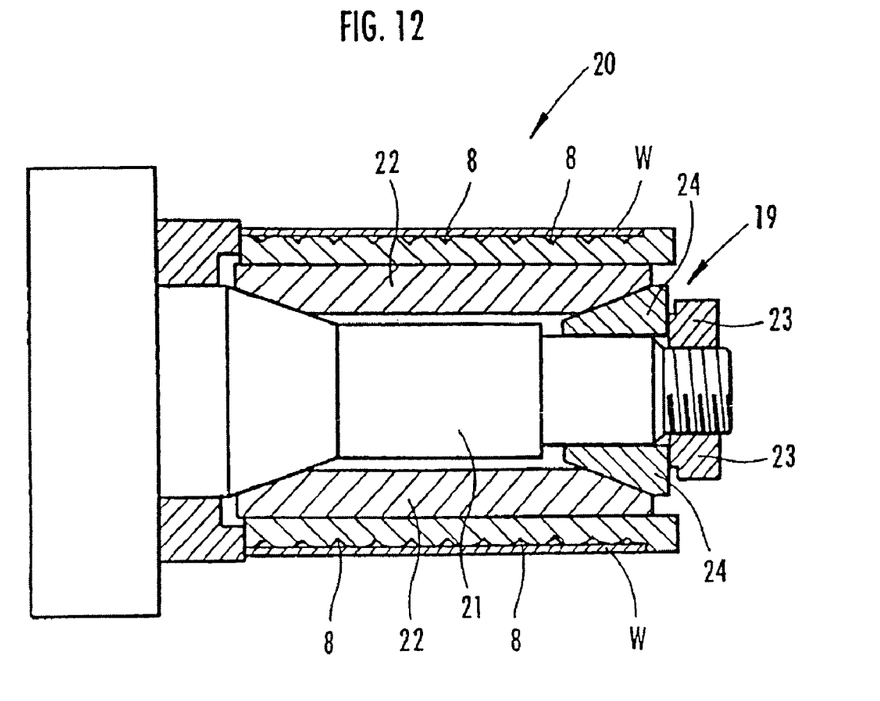
FIG. 12 is an explanatory sectional view showing an apparatus form using the holder of FIG. 11.

When the holder 14 is used, drum holding means 20 is further used as shown in FIG. 12. The drum holding means 20 comprises diameter increasing means 19 for increasing the diameter of the holder 14. The configuration of the drum holding means 20 will be briefly described below. The holder 14 is detachably attached to a support shaft 21, which is connected to rotary driving means (not shown), via a collet 22 which freely increases in diameter. The diameter increasing means 19 for increasing the diameter of the holder 14 is attached to the end of the support shaft 21 via the collet 22. With the diameter increasing means 19, a tapered member 24 is moved forward and backward by rotating the gland nut 23 and the diameter of the collet 22 is increased, so that the diameter of the holder 14 is increased. Then, the diameter of the holder 14 is increased while the drum W is held, so that the holder 14 is brought into contact with the inner peripheral surface of the drum W. Thus, it is possible to prevent a slip between the holder 14 and the drum W and remarkably reduce variations in the dimensions of metal rings cut from the drum W, thereby achieving metal rings with high accuracy.

The present embodiment described the apparatus 1 for cutting the drum W formed of a thin metallic plate. The present invention is not particularly limited. Even on a flat thin plate (not shown), it is possible to cut edges while preventing the occurrence of blurs, by using the shape of the groove 8 and the shearing cutter 7 which are shown in FIG. 2 or 8.

INDUSTRIAL APPLICABILITY

The present invention is used when a thin metallic plate is cut and when a drum formed of a thin metallic plate in a cylindrical shape is cut in round slices, so that the occurrence of blurs is prevented on cut edges and the cut edges can be shaped with great ease. For example, the present invention can be suitably used for manufacturing a belt for power transmission in an infinite variable speed drive.

The invention claimed is:

1. A cutting device for cutting a thin metallic plate with a predetermined width, comprising:
   a shearing cutter which is pressed to a predetermined position on a front side of the thin plate to cut the thin plate; and
   a contacting member which has a groove facing a cutting position of the shearing cutter and makes contact with a back side of the thin plate,
   wherein the shearing cutter is made of a metal having a higher hardness than the thin plate and has a blade angle of 50 to 90° and is symmetrically shaped with reference to a distal end of the blade in a vertical direction to a pressing direction of the shearing cutter on the thin plate,
   the groove of the contacting member is symmetrically shaped with reference to a center of the groove about the vertical direction;
   an interval between opposing inner walls of the groove is wider at an upper edge of the groove and becomes narrow towards a deepest portion of the groove;
   the inner walls of the groove have curved surfaces each of which has a radius of 15 to 20 times the thickness of the thin plate and is expanded to an inside of the groove, in order to gradually bend the thin plate pressed by the cutter along the curved surface on the groove, thereby causing a material flow in a direction of separating from the cutter on a portion of the thin plate where the cutter cuts in, stretching an uncut side of the thin plate to the edge of the cutter, locally reducing the thickness of a portion of the thin plate where the edge of the cutter faces, and forming a constriction deformed in a concave manner to the edge of the cutter;
   an interval between upper edges of opposing inner walls of the groove is 15 to 30 times a thickness of the thin plate in order to gradually bend the thin plate pressed by the cutter along the curved surface on the inner walls of the groove and to prevent contact of the thin plate with the deepest portion of the groove before being cut, thereby forming the constriction;
   a depth of a deepest portion at the center of the groove is one to three times the thickness of the thin plate in order to prevent contact of the thin plate with the deepest portion of the groove before being cut, thereby forming the constriction, and in order to form the curved surfaces with the curvature radius of 15 to 50 times the thickness of the thin plate.

2. The cutting device according to claim 1, wherein the groove of the contacting member comprises a flat portion which is evenly formed so that the deepest portion has a constant depth between the inner walls.

3. The cutting device according to claim 2, wherein the shearing cutter and the groove are configured to form a cut edge of the thin plate when the thin plate is cut by the shearing cutter, a first cut inclined surface which is inclined along a face of the shearing cutter, a second cut inclined surface which is inclined along the flat portion of the groove, and a cut top portion where an edge of the first cut inclined surface and an edge of the second cut inclined surface intersect with each other; and when a width from a starting point of the second cut inclined surface to the cut top portion is set beforehand to position the cut top portion of the thin plate at the center of the thickness of the plate, the width of the flat portion between the inner walls of the groove is set at twice the width of the second cut inclined surface.

4. The cutting device according to claim 3, wherein the thin metallic plate forms a cylindrical drum, the contacting member is formed into a cylinder which can make contact with an inner peripheral surface of the drum and holds the drum on an outer periphery thereof, a plurality of the grooves are formed on the outer periphery of the contacting member at predetermined intervals, the shearing cutter is formed like a disk having a cutting edge on a circumference thereof, the shearing cutter cuts in the grooves on an outer peripheral surface of the drum while rotating, and the shearing cutter cuts the drum with a predetermined width in a circumferential direction to form a metal ring shaped like an endless belt.

5. The cutting device according to claim 2, wherein the thin metallic plate forms a cylindrical drum, the contacting member is formed into a cylinder which can make contact with an inner peripheral surface of the drum and holds the drum on an outer periphery thereof, a plurality of the grooves are formed on the outer periphery of the contacting member at predetermined intervals, the shearing cutter is formed like a disk having a cutting edge on a circumference thereof, the shearing cutter cuts in the grooves on an outer peripheral surface of the drum while rotating, and the shearing cutter cuts the drum with a predetermined width in a circumferential direction to form a metal ring shaped like an endless belt.

6. The cutting device according to claim 1, wherein the thin metallic plate forms a cylindrical drum, the contacting member is formed into a cylinder which can make contact with an inner peripheral surface of the drum and holds the drum on an outer periphery thereof, a plurality of the grooves are formed on the outer periphery of the contacting member at predetermined intervals, the shearing cutter is formed like a disk having a cutting edge on a circumference thereof, the shearing cutter cuts in the grooves on an outer peripheral surface of the drum while rotating, and the shearing cutter cuts the drum with a predetermined width in a circumferential direction to form a metal ring shaped like an endless belt.

7. The cutting device according to claim 6, wherein the contacting member comprises a plurality of slots borne along the longitudinal direction and is expandable in a diameter direction.

8. The cutting device according to claim 6, wherein the contacting member comprises clamping means for fixing one end of the drum when the drum is held on the outer periphery thereof, and when the shearing cutter cuts in the groove via the drum, a position of an edge of the shearing cutter is set closer to an unfixed side on the other end of the drum by a distance within one third of a thickness of the drum from the center of the interval between the upper edges of the opposing inner walls of the groove.

9. The cutting device according to claim 8, wherein during cutting of the drum, a position of the edge of the shearing cutter is set at a distance of 0.2 to 0.4 times the thickness of the drum from the deepest portion of the groove when the shearing cutter enters most deeply in the groove.

* * * * *